United States Patent [19]
Barton et al.

[11] 3,872,086
[45] Mar. 18, 1975

[54] CERTAIN DISULFIDE DERIVATIVES OF 2-AZETIDINONES

[75] Inventors: Derek Harold Richard Barton, London; William George Elphinstone Underwood, Stoke Poges; Brian Edgar Looker, Greenford; Graham Hewitt, Northolt; Michael Victor Taylor, London, all of England

[73] Assignee: Glaxo Laboratories Limited, Greenford, England

[22] Filed: July 30, 1971

[21] Appl. No.: 167,848

[30] Foreign Application Priority Data
Nov. 3, 1970 United Kingdom............... 52288/70

[52] U.S. Cl...... 260/239 A, 260/243 R, 260/243 C, 260/306.7, 260/310 D, 424/244
[51] Int. Cl. ..................... C07d 25/00, C07d 49/10
[58] Field of Search......... 260/239 A, 243 R, 310 D

[56] References Cited
UNITED STATES PATENTS
3,679,676    7/1972    Heusier et al................. 260/243 R

*Primary Examiner*—Alan L. Rotman
*Attorney, Agent, or Firm*—Bacon & Thomas

[57] ABSTRACT

Compounds of the general formula

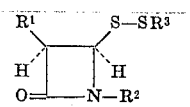

I (wherein $R^1$ is an amino group or a blocked amino group; and $R^2$ is an aliphatic, araliphatic or aromatic group while $R^3$ is the residue of a thiophilic sulphur nucleophile or is a group of formula

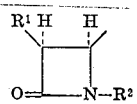

II or $R^2$ is a hydrogen atom while $R^3$ is the residue of a thiophilic sulphur nucleophile or may, when $R^1$ is a phenylacetamido or phenoxyacetamido group, be a group of formula II in which $R^2$ is hydrogen) are provided. The new compounds are useful as intermediates in the production of cephalosporins, penicillins and related β-lactam antibiotic compounds. The new compounds may be obtained from penicillin 1-oxides by cleavage of the 1,2-sulphur-carbon bond thereof and attachment of the group —$SR^3$ to the sulphur atom in one or more stages.

2 Claims, No Drawings

CERTAIN DISULFIDE DERIVATIVES OF 2-AZETIDINONES

This invention relates to novel semisynthetic intermediates or relay compounds of use in the production of cephalosporins, penicillins and related β-lactam antibiotic compounds.

The first total synthesis of a cephalosporin antibiotic was achieved by R.B. Woodward (J.A.C.S. 1966, 88, (4),852) starting from L(+)-cysteine and proceeding via about eight synthetic steps to a β-lactam (i) which was then converted into a cephem (iii) by the following reaction sequence;

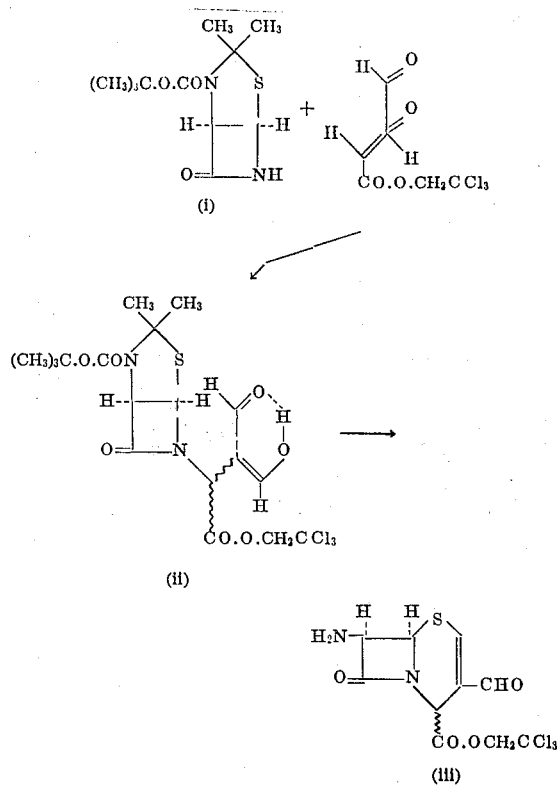

The compound (i) thus constitutes a valuable intermediate in the preparation of cephalosporins and other β-lactam antibiotics; by reaction with an analogous aldehyde reagent it is also possible to convert (i) into a penicillin and it will be appreciated that in this way penicillins having varying substitution in the five-membered ring can be produced. Similarly by replacing the 2,2,2-trichloroethyl 3,3-diformylacrylate reagent by suitably substituted alternatives, a series of cephalosporin analogues can be prepared.

R.B. Woodward started from L(+)- cysteine in orde to achieve a total synthesis. However, this material is relatively expensive and even more significantly, its conversion into a β-lactam of the required stereochemical configuration requires extremely careful control of the stereochemistry at several points. Copending applications Ser. Nos. 167,876, 167,847 and 167,874 by Barton, Long, Looker, Wilson and Underwood; Underwood and Hewitt; and Underwood and Long all of even date herewith describe the preparation from penicilins of intermediates closely similar to Woodward's compound(i).

The present invention is concerned with alternative intermediates of the formula

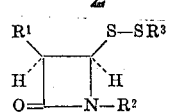

wherein $R^1$ is an amino group or a blocked amino group; $R^2$ is a hydrogen atom or an aliphatic, araliphatic or aromatic group; and $R^3$ is the residue of a thiophilic sulphur nucleophile or is a group of formula

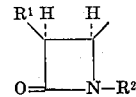

where $R^1$ and $R^2$ are as defined above.

These compounds can be cleaved with retention of the configuration of the asymmetric centres and converted into corresponding compounds having an etherified or esterified thiol grouping in place of the group $S.SR^3$ which can then be converted into polycyclic structures such as penams, cephams and cephems.

The disulphides of formula 1 are key intermediates in the preparation of cephalosporins, penicillins and related β-lactam antibiotics. The compounds of formula 1 in which $R^1$ and $R^3$ have the above meanings and $R^2$ is an aliphatic araliphatic, or aromatic group and also those in which $R^2$ is hydrogen and either $R^1$ has the above meaning and $R^3$ is the residue of a thiophilic nucleophile or $R^1$ is a phenylacetamido or phenoxyacetamido group and $R^3$ is a group of formula II, which are new compounds and constitute a further feature of the invention. The disulphides may be cleaved to yield further intermediates as described in the copending application Ser. No. 167,875 of Barton, Sammes, Hewitt, Looker and Underwood of even date herewith. These further intermediates may subsequently be cyclised to yield compounds having a penam or cepham structure.

Unsymmetrical disulphides of formula I may, for example, be prepared by reacting a pencillin oxide of the formula

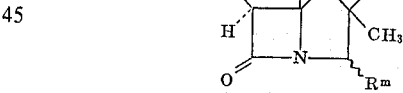

(where $R^1$ has the above meaning and $R^m$ is a hydrogen atom, a hydroxy group, an esterified or etherified hydroxy group, an amino group, an acylamino group, a carboxyl group or an esterified carboxyl group) with a thiophilic sulphur nucleophile such as a thiol of formula $R^3SH$. Preferred thiols include alkanethiols of from one to 20 carbon atoms, 2-methyl-1-propanethiol and n-butanethiol being especially suitable. It should be noted that thiosulphates, sulphites, sulphinates, thiocyanates, thioglycollates and thioureas and other thioamides can also serve as thiophilic sulphur neclophiles.

An excess of the thiol may serve as a solvent for the reaction, of the reaction may be effected in the presence of an inert solvent. Suitable inert solvents include aromatic hydrocarbons such as toluene or benzene, esters such as ethyl acetate, chlorinated hydrocarbons such as methylene chloride or dichlorethane, cyclic ethers such as tetrahydrofuran or dioxan, and amide, imide or hydantoin solvents such as dimethylformamide and dimethylacetamide; and sulphoxide solvents such as dimethylsulphoxide.

The reaction may advantageously be effected at temperatures within the range 30° to 150°C. The preferred temperature range is 50° to 120°C.

Symmetrical disulphides of formula I, for example compounds of formula

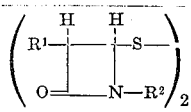

III may be prepared by selective oxidation, (avoiding oxidation of the disulphide group), for example by means of oxidising agents conventional for the oxidation of a thiol to the corresponding disulphide, e.g., a halogen or hydrogen peroxide or a peracid such as peracetic, perphthatic or m-chlorobenzeic acid of a thiazoline of formula

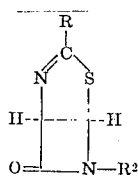

IV where R and $R^2$ have the above meanings.

The oxidation is effected in a protic solvent, perferably a hydroxylic solvent such as an alkanol, e.g., methanol or ethanol and more preferably an aqueous solvent. The oxidation is preferably effected by means of chlorine, bromine or, more advantageously iodine. Where a completely anhydrous hydroxylic solvent such as methanol is used the product may be an imino-ether rather than the desired amide; treatment with a protic solvent such as water yields the amide, however, without difficulty. The above processes constitute further features of the present invention.

In formula I, $R^1$ is an amino group or a blocked amino group, including the 6-acylamino groups present in penicillins, which may be represented as NHCOR.

The term 'blocked amino' groups as used herein refers to amino groups which are not free primary amino groups, but carry substituents such as acyl groups. The term 'protected amino' groups as used herein refers to amino groups carrying substituents which are readily removed to yield a free amino group, without unwanted degradation of the rest of the molecule, for example by acidic or basic hydrolysis, enzymic hydrolysis, reduction or hydrogenolysis.

Typical protected amino groups are illustrated in the following table:

| Type | Example | Usual name and analogues, etc. |
|---|---|---|
| Urethane | HNCOCH₂Ph ‖ O | Benzyloxycarbonyl, p-methoxy. |
| Urethane | HNCOC(CH₃)₃ ‖ O | t-Butoxycarbonyl. |
| Urethane | HNCOCHPh₂ ‖ O | Diphenylmethoxycarbonyl. |
| Urethane | HNCO-(1-adamantyl) ‖ O | 1-adamantyloxycarbonyl. |
| Arylmethylamino | HNCPh₃ | Trityl. |
| Onium | NH₃⁺ | |
| Urethane | HN.CO.OCH₂CCl₃ | β,β,β-Trichloroethoxycarbonyl. |

In the aforementioned side chain —NHCOR, the group R can be hydrogen or any grouping present in the 6-acyl side chain of a pencillin.

R can be defined generally as hydrogen or an organic group which preferably contains one to 20 carbon atoms. A wide range of substituents may be present.

In general, the following main classes are especially suitable for the acyl group RCO—:

i. $R^u C_n H_{2n}$-CO where $R^u$ is aryl (carbocyclic or heterocyclic), cycloalkyl, substituted aryl, substituted cycloalkyl, cyclohexadienyl, or a non-aromatic or mesoionic heterocyclic group, and n is an integer from 1–4. Examples of this group include phenylacetyl; substituted phenylacetyl e.g., fluorophenylacetyl, nitrophenylacetyl, aminophenylacetyl, acetoxyphenylacetyl, methoxyphenylacetyl, methylphenylacetyl, or hydroxyphenylacetyl; N,N-bis(2-chloroethyl)aminophenylpropionyl; thienyl-2-and -3-acetyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being e.g., phenyl or halophenyl e.g., chloro- or bromo- phenyl. An acyl group of this type is 3-o-chlorophenyl-5-methyl isoxazol-4-yl-acetyl.

ii. $C_m H_{2m+1}$CO— where m is an integer from 1–7. The alkyl group may be straight or branched and, if desired, may be interrupted by an oxygen or sulphur atom or substituted by e.g., one or more halogen atoms, a cyano group, a carboxy group, an alkoxycarbonyl group, a hydroxy group or a carboxycarbonyl group (—CO.-COOH). Examples of such groups include cyanoacetyl, hexanoyl, heptanoyl, octanoyl, butylthioacetyl, chloroacetyl and trichloroacetyl groups.

iii. $C_p H_{2p-1}$CO— where p is an integer from 2–7. The alkenyl group may be straight or branched and, if desired, may be interrupted by an oxygen or a sulphur atom. An example of such a group is allylthioacetyl.

iv.

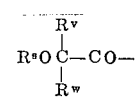

where $R^s$ is as defined above for $R^u$ or may be a benzyl group, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, 2-phenoxypropionyl, 2-phenoxybutyryl, 2-methyl-2-phenoxypropionyl, p-cresoxyacetyl and P-methylthiophenoxyacetyl.

v.

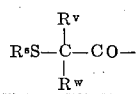

where $R^s$, $R^v$ and $R^w$ have the meanings defined under (iv). Examples of such groups include S-phenylthioacetyl, S-chloro phenylthioacetyl, s-fluorophenylthioacetyl, pyridyl-thioacetyl, and S-benzylthioacetyl.

vi. $R^sZ(CH_2)_qCO$- where $R^s$ has the meaning defined under (v), Z is an oxygen or sulphur atom and $q$ is an integer from 2–5. An example of such a group is S-benzylthiopropionyl.

vii. $R^uCO$— where $R^u$ has the meaning defined under (i). Examples of such groups include benzoyl, substituted benzoyl (e.g., aminobenzoyl), 4-isoxazolyl and substituted 4-isoxazolycarbonyl, cyclopentanecarbonyl, sydnonecarbonyl, naphthoyl and substituted naphthoyl (e.g., 2-ethoxynaphthoyl), quinoxalinylcarbonyl and substituted quinoxalinylcarbonyl (e.g., 3-carboxy-2-quinoxalinylcarbonyl). Other possible substituents for benzoyl include alkyl, alkoxy, phenyl, phenyl substituted by carboxy, alkylamido, cycloalkylamido, allylamido, phenyl-(lower)-alkyl amido, morpholinocarbonyl, pyrrolidinocarbonyl piperidinocarbonyl, tetrahydropyridono, furfurylamido or N-alkyl-N-anilino, or derivatives thereof and such substituents may be in the 2- or 2- and 6-positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, substituents may be as set out above under (i). Examples of such 4-isoxazolyl groups are 3-phenyl-5-methylisoxazol-4-yl carbonyl, 3-o-chlorophenyl-5-methyl isoxazol-4-yl carbonyl and 3-(2,6-dichlorophenyl)-5-methyl-isoxazol-4-yl carbonyl.

viii.

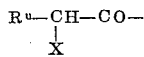

where $R^u$ has the meaning defined under (i) and X is amino, substituted amino (e.g., acylamido or a group obtained by reacting the α-amino-acylamido group of the 6-side chain with an aldehyde or ketone e.g., acetone, methylethylketone or ethyl acetoacetate), hydroxy, carboxy, esterified carboxy, triazolyl, tetrazolyl, cyano, halogeno, acyloxy (e.g., formyloxy or lower alkanoyloxy) or etherified hydroxy group. Examples of such acyl groups are α-aminophenyl-acetyl and α-carboxyphenylacetyl.

ix.

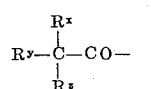

where $R^x$, $R^y$ and $R^z$ which may be the same or different may each represent lower alkyl, phenyl or substituted phenyl. $R^x$ can also be hydrogen. An example of such an acyl group is triphenylmethyl-carbonyl.

x.

$$R^t-NH-\overset{O}{\underset{\|}{C}}-$$

where $R^t$ is as defined above for $R^u$ or may be hydrogen, lower alkyl or halogen substituted lower alkyl. An example of such a group is $Cl(CH_2)_2NHCO$ xi.

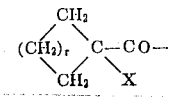

where X has the meaning defined under (viii) above and $r$ is an integer of from 1 to 4. An example of such an acyl group is 1-aminocyclohexanecarbonyl.

xii. Amino acyl, for example $R^aCH(NH_2).(CH_2)_kCO$ where $R^a$ is as defined above for $R^u$ or is a hydrogen atom or an alkyl, aralkyl or carboxy group and $k$ is an integer from 1 to 10 or $NH_2C_hH_{2h}Ar(CH_2)_gCO$ where $g$ is zero or an integer from 1 to 10, $h$ is 0, 1 or 2 and Ar is an arylene group, e.g., p-phenylene or 1,4-naphthylene. Examples of such groups are disclosed in British Patent Specification No. 1,054,806. A group of this type is the p-aminophenylacetyl group. Other acyl groups of this type include those, e.g., δ-aminoadipoyl, derived from naturally occurring amino acids and derivatives thereof e.g., N-benzoyl-δ-aminoadipoyl or N-chloroacetyl-δ-aminoadipoyl.

xiii. Substituted glyoxylyl groups of the formula $R^b.CO.CO$— where $R^b$ is an aliphatic, araliphatic or aromatic group, e.g., a thienyl group, a phenyl group, or a mono-, di- or tri- substituted phenyl group, the substituents being, for example, one or more halogen atoms (F, Cl, Br, or I), methoxy groups, methyl groups or amino groups, or a fused benzene ring. Included in this group are also the α-carbonyl derivatives of the above substituted glyoxylyl groups, formed for example with hydroxylamine, semicarbazide, thiosemicarbazide, isoniazide or hydrazine.

Preferred amino protecting groups are the hydrocarbyloxy-carbonyl groups (wherein the amino group forms part of a urethane), in particular alkoxycarbonyl groups such as methoxycarbonyl, ethoxycarbonyl and, most preferably, t-butoxycarbonyl groups, which may carry substituents such as halogen atoms as in the 2,2,2-trichloroethoxycarbonyl group, as well as aralkoxycarbonyl groups such as benzyloxy-carbonyl, p-methoxybenzyloxycarbonyl and diphenylmethoxycarbonyl groups. Cycloalkoxycarbonyl groups are also advantageous, especially the adamantyloxycarbonyl group. The p-nitrobenzyloxycarbonyl group, which can be selectively removed by reduction e.g., hydrogenolysis, is also useful. Such penicillins carrying protecting groups of this type may be prepared from 6-aminopenams by conventional methods for example by reaction with an appropriate haloformic ester.

The group $R^2$ is hydrogen or an aliphatic, araliphatic or aromatic group, for example a group derived from the thiazolidine ring of a penicillin as described in our said copending Applications.

Thus, for example, $R^2$ can be a group of the formula

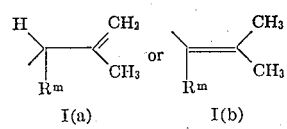

where $R^m$ is a hydrogen atom; an esterified or etherified hydroxy group; an acylamino group e.g., a urethane group; a carboxyl group or an esterified carboxyl group. $R^2$ can also be a pyrazoline derivative of a group of formula $Ib$.

Where $R^m$ is an etherified or esterified hydroxyl group or includes such a group as in urethanes or esterified carboxyl groups, the O- attached grouping is preferably readily cleaved to hydroxyl, for example by mild acidic, basic or enzymic hydrolysis, reduction or hydrogenolysis, to permit removal of the whole chain on the β-lactam nitrogen. Such removable groups include, in particular, the tetrahydropyranyloxy, 4-methoxytetrahydropyranyloxy, di-(2-chloroethoxy)-methoxy, diphenylmethoxy, carbobenzoxy or trifluoroacetoxy groups. Where $R^m$ is a urethane group the terminal alcohol or phenol residue is preferably one which is readily cleaved by acidic, basic, enzymic hydrolysis, reduction or hydrogenolysis. Such alcohol residues include, in particular, 2-halo-lower alkyl groups, preferably carrying more than one halogen atom, for example a 2,2,2-trichloroethoxy or 2,2,2-trichloro-1-methylethoxy group or a 2,2,2-tribromoethoxy group; or a 2-iodoethoxy or 2-bromoethoxy group. These groups may readily be removed by reduction. The alcohol residue may also be an arylmethyl group such as a benzyl group which may be removed by hydrolysis.

$R^2$ can also be an aliphatic, araliphatic or aromatic group other than the residue of a thiazolidine ring. Such groups advantageously carry functional substituents which will permit cyclisation of the compound when the disulphide is cleaved in accordance with the process described in the copending Application of Barton, Sammes, Hewitt, Looker and Underwood Ser. No. 167,875 providing, for example, a further thiazolidine ring or a perhydrothiazine ring to yield a further penicillin or a cephalosporin. Such functional substituents include, in particular, reactive ester substituents such as halogen atoms and aliphatic or aromatic sulphonyloxy groups, carboxyl groups and esterified carboxyl groups. Such groups $R^2$ can be introduced by the methods described in the copending application Ser. No. 167,849 of Barton, Underwood, Looker and Hewitt of even date herewith. Thus, for example, if $R^2$ is an esterified β-halo-β-carboxyethyl group, cleavage of the disulphide results in cyclisation to yield, after de-esterification, a 2-carboxypenam. In this way we have prepared 2R,5R,6R-6-phenylacetamido -2-carboxypenam and its 2S-isomer, which in the form of their sodium salts have shown antibiotic activity against penicillin-resistant gram negative organisms.

$R^3$ is the rsidue of a thiophilic sulphur nucleophile or the group.

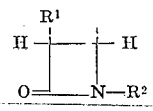

where $R^1$ and $R^2$ have the above meanings.

The group $R^3$ may thus be the residue of a thiol, preferably an aliphatic, araliphatic, cycloaliphatic or aromatic group, which advantageously contains one to 20 carbon atoms. $R^3$ may thus, for example, be an alkyl group, preferably containing one to six carbon atoms, e.g., a methyl, ethyl, butyl or iso-butyl group; an aralkyl group, preferably containing one to six carbon atoms in the alkyl portion, e.g., a benzyl, phenethyl or phenyl-propyl group; a cycloalkyl group which may contain five to seven carbon atoms in the ring and in which other aliphatic ring substituents containing up to six carbon atoms may be present; or a monocyclic aryl group such as a phenyl or substituted phenyl group. Such groups may be saturated or unsaturated and may carry substituents. On cleavage of the disulphide by the method of the copending Application Ser. No. 167,875 of Barton, Sammes, Hewitt, Looker and Underwood the group $R^3$ may become the etherifying group of the etherified thiol and so may advantageously possess substituents or reactive bonds permitting cyclisation with the β-lactam nitrogen or a group attached thereto. Such substituents include reactive ester substituents, for example, halogen atoms and aromatic and aliphatic sulphonyloxy groups, carboxyl or esterified carboxyl groups or amino groups.

The preparation of thiazolines of formula IV is described in copending Applications Ser. Nos. 167,876 and 167,847 by Barton, Long, Looker, Wilson and Underwood and by Underwood and Hewitt. Compounds in which $R^2$ is a group of formula $Ib$ can be converted into their pyrazoline derivatives by reaction with a diazo reagent of the formula $N_2CH R^4$ where $R^4$ is an aliphatic, araliphatic or aromatic group. The reaction may be effected in an inert solvent, for example an ether, halogenated hydrocarbon or hydrocarbon solvent, preferably at a temperature between −15° to +50°C, more preferably −10° to +15°C.

PREPARATION OF STARTING MATERIALS

A. Methyl 3-[(1'R,5'R)-3'-benzyl-4',7'-diaza-6'-oxo-2'-thiabicyclo[3',2',0']-hept-3'-ene-7'-yl]-2-bromopropionate.

A solution of (1R,5R)-3-benzyl-4,7-diaza-6-oxo-2-thiabicyclo[3,2,0]-hept-3-ene (5 g., 24 m.mole) in acetone (200 ml.) was treated with anhydrous potassium carbonate (5 g.) and methyl 2,3-dibromopropionate (0.66 ml., 3 equivs.) at 22°. The reaction mixture was stirred for 6 hours. Methyl 2,3-dibromopropionate (0.42 ml. 2 equivs) was added and the reaction continued for a total of 48 hours. After filtration through kieselguhr the filtrate was evaporated to an oil which was chromatographed on silica (50 g.) with benzene:ethyl acetate = 3:1 as solvent. The title compound, $R_f$ 0.43 (starting material $R_f$ 0.35 in benzene:ethyl acetate = 1:1) was isolated as a mixture of isomers and as an oil (4.0 g, 43%), $\nu_{max}$.(CHBr₃) 3440 (NH), 1770 (β-lactam), 1,740 (CO₂R), and 752 cm⁻¹ (phenyl), NMR CDCl₃, τ) 2.69 (phenyl), 4.01 and 4.06 (5–H multiplet J 4 Hz.), 4.35 and 4.43 (1-H, multiplet J 4 Hz), 5.58 (multiplet, N—CH—CO₂—) 6.12 (—CH₂ phenyl) 6.22 and 6.25 (OCH₃) and 6.1 and 6.4 (multiplet —CH₂Br).

B. p-Nitrobenzyl-3-(1'R,5'R)-3'-benzyl-4',7'-diaza-6'-oxo-2'-thiabicyclo[3',2',0']-hept-3'-ene-7'-yl -2-bromopropionate A solution of (1R,5R)-3-benzyl-4,7-diaza-6-oxo-2-thia-bicyclo[3,2,0]-hept-3-ene (1.9 g. 0.87 m.mole) and sodium hexamethyldisilazanyl (1.5 g. 1 equiv.) in N,N-dimethylformamide (15 ml.) was cooled to 10°. p-Nitrobenzyl 2,3-dibromopropionate (3.2 g 1 equiv.) in N,N-dimethylformamide (4 ml.) was added quickly and the mixture stirred at 15° for 10 minutes. After pouring into water (150 ml.) and extracting with ethyl acetate (40 ml.), the organic phase was washed with water, dried, and evaporated to a gum. Chromatography on silica (40 g.) using benzene:ethyl acetate = 4:1 solvent gave the title compound (0.75 g. 19%) as a foam ($R_f$ 0.61 in benzene: ethyl acetate = 1:1), $\nu_{max}$.(CHBr$_3$) 1770 (β-lactam), 1740 (—CO$_2$R), 1536 and 1350 Cm$^{-1}$ (NO$_2$), NMR. (CDCl$_3$ τ), 1.8 and

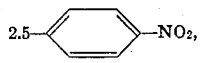

AB-quartet, J 9 Hz), 2.68 (phenyl), 4.1 and 4.45 (5-H and 1-H respectively J 4 Hz), 4.75

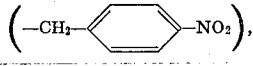

and 6.2 (—CH$_2$ phenyl).

EXAMPLE 1

2′,2′,2′-Trichloroethyl(3R,4R)-α-isopropylidene-α-[3-phenylacetamido-4-(2′-methylpropyldithioazetidin-2-on-1-yl]-acetate.

A solution of 2′,2′,2′-trichloroethyl 6β-phenylacetamidopenicillanate, 1β-oxide (15.0 g., 0.0312 mole) in 2-methyl-1-propanethiol (300 ml.) was refluxed for 120 hours. The mixture was evaporated to give a white solid which was recyrstallised from ether, yielding 2′,2′,2′-trichloroethyl(3R,4R)-α-isopropylidene-α-[3-phenylacetamido-4-(2′-methylpropyldithioazetidin-2-on-1-yl]-acetate (11.23 g., 65%), m.p. 103° to 104°, [α]$_D^{24}$ + 3.0° (c 3.58, chloroform), $\nu_{max}$. (Nujol) 1770 (β-lactam), 1,735 (unsaturated ester, 1660 (amide), 1560 (amide) and 715 cm.$^{116\ 1}$ (CCl$_3$), N.M.R. (100 MHz, CDCl$_3$, τ), 2.72 (5-proton singlet, phenyl protons), 3,92 (1-proton doublet, J 8 Hz, amide N-H proton), 4.56 (1-proton doublet, J 4 Hz, β -lactam proton), 4.76 (1-proton double doublet, J 4 Hz, 8 Hz, β-lactam proton), 5.23 (2-proton AB-quartet, J 12 Hz, —CH$_2$CCl$_3$), 6.32 (2-proton singlet, —CH$_2$Ph), 7.52 (2-proton doublet, J 7 Hz, SCH$_2$CH(CH$_3$)$_2$), 7.64 (3-proton singlet, geminal methyl protons), 7.84 (3-proton singlet, geminal methyl protons) 8.32 (1-proton multiplet, SCH$_2$CH(CH$_3$)$_2$), and 9.06 (6-proton doublet, J 7 Hz, SCH$_2$CH(CH$_3$)$_2$) (Found: C, 47.8; H, 4.9; N, 5.0; S 11.8; Cl 19.0 C$_{22}$H$_{27}$O$_4$N$_2$S$_2$Cl$_3$ (553.5) requires C, 47.8; H, 4.9; N, 5.1; S, 11.6; Cl, 19.2%).

Example 2

2′,2′,2′-Trichloroethyl (3R,4R)-α-isopropylidene-α-[3-phenylacetamido-4-cyclohexyldithioazetidin-2-on-1-yl]acetate A solution of 2′,2′,2′-trichloroethyl 6β-phenylacetamidopenicillanate1β-oxide (0.500 g, 1.04 m.mole) in cyclohexanethiol (20 ml), containing a catalytic amount of aluminium tribromide, was refluxed for 1 minute. The mixture was evaporated to give a gum which was purified by chromatogrphy on silica [20 g], with benzene : ethyl acetate = 10:1 as solvent. The resulting gum was cyrstallized from ether, yielding 2′,2′,2′-trichloroethyl (3R,4R)-α-isopropylidene-α-[3-phenylacetamido-4-cyclohexyldithioazetidin-2-on-1-yl]acetate (0.060 g, 10%) m.p. 108° to 110°, $\nu_{max}$. (Nujol) 3300 (NH), 1775 (β-lactam), 1,735 (unsaturated ester), 1,660 (amide), 1,560 (amide) and 700 cm.$^{116\ 1}$ (CCl$_3$), N.M.R. (CDCl$_3$, τ), 2.69 (5-proton singlet, phenyl protons), 3.87 (1-proton doublet, J 8 Hz, amide NH), 4.62 (1-proton doublet J 4 Hz, 4-H), 4.81 (1-proton double doublet, J 4 Hz, 8 Hz, 3-H), 5,23 (2-proton AB-quartet, J 12 Hz, —CH$_2$CCl$_3$), 6.37 (2-proton singlet —CH$_2$Ph), 7.48 (1-proton multiplet,

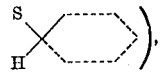

7.68 (3-proton singlet, (CH$_3$)), and 7.84 (3-proton singlet (CH$_3$)), 8.22 (4-proton multiplet

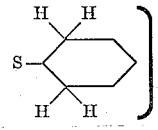

and 8.78 (6-proton multiplet,

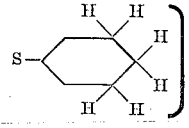

Example 3

2′,2′,2′-Trichloroethyl(3″R,4″R)-4,4-Dimethyl-3-[3″-phenylacetamidoazetidin-2″-on-4″-(2″-methylpropyl)dithio-1″-yl]-1pyrazoline-3470 -carboxylate.

2′,2′,2′-Trichloroethyl (3R,4R)-isopropylidene-α-[3-phenylacetamido-4-(2′-methylproply)dithioazetidin-2-on-1-yl]acetate (0.50 g., 0.90 m.mole) was dissolved in the minimum quantity of dry ether [20 ml.] and the solution cooled to 5°. A large excess of freshly prepared diazomethane in ether [15 ml.] at 5° was then added to the above solution, and the mixture was allowed to stand at 5° for 6 days. The diazomethane was then allowed to evaporate, and the solvent removed in vacuo to give a foam, 2′,2′,2′-trichloroethyl (3″R,4″R)-4,4-dimethyl-3-[3″-phenylacetamidoazetidin-2″-on-4″-(2″-methylpropyl) dithio-1″-yl]-1-pyrazoline-3ζ-carboxylate (0.541 g., 99%), as two epimers, $R_f$ 0.43 and 0.54 (benzene:ethyl acetate = 2:1). The more polar epimer constituted about 80 percent of the mixture. Characteristics for the less polar epimer were: λ$_{max}$. 334 nm (ε∼200), $\nu_{max}$. (CHCl$_3$), 1775 (β-lactam), 1,750 (saturated ester), 1670 (amide), 1540 (amide and —N=N—), N.M.R. (CDCl$_3$, τ) 2.63 (5-proton singlet, phenyl protons), 3.80 (1-proton doublet, J8Hz, amide NH proton), 4.41 (2-proton multiplet, 3″-H and 4″-H), 5.22 (2-proton broad singlet, pyrazoline protons), 5.30 (2-proton AB-quartet, J12Hz, CH$_2$CCl$_3$), 6.30 (2-proton singlet, —CH$_2$Ph), 7.33 (2-proton multiplet, S—CH$_2$CH(CH$_3$)$_2$), 8.20 (1-proton multiplet S—CH$_2$CH(CH$_3$)$_2$), 8.70 (3-proton singlet, (CH$_3$)), 8.92 (3-proton singlet, (CH$_3$)), and 9.03 (6-proton doublet, J6Hz, —SCH$_2$CH(CH$_3$)$_2$).

Characteristics for the more polar epimer were as for the less polar epimer except N.M.R. (CDCl$_3$, τ), 2.62 (5-proton singlet, phenyl protons), 3.74 (1-proton doublet, J8Hz, amide NH proton), 4.30 (1-proton double doublet, J4Hz, 8Hz, 3″-H), 4.70 (1-proton doublet, J4Hz, 4″-H), 5.30 (2-proton broad singlet, pyrazoline protons), 5.36 (2-proton AB-quartet, J12Hz, —CH$_2$CCl$_3$), 6.32 (2-proton singlet, —CH$_2$Ph), 7.40 (2-proton multiplet, SCH$_2$CH(CH$_3$)$_2$), 8.30 (1proton multiplet, SCH₂CH(CH₃)₂), 8.62 (3-proton singlet, geminal methyl protons) and 9.05 (9-proton multiplet, 3 geminal methyl protons SCH₂CH(CH₃)₂).

EXAMPLE 4

(3R,4R)-4-(2'-methylpropyldithio)-3-phenylacetamidoazetidin-2-one

The starting material used in this Example was prepared as described in the copening Application Ser. No. 167,847 of Underwood, and Hewitt.

(1S,5R,6R)-2,2-dimethyl-3-hydroxy-6β-phenylacetamidopenam-1-oxide (1 g. 0.0031 mole) was refluxed with 2-methyl-1-propanethiol (15 ml. 1.5 mole) for 17 hours. The mixture was evaporated under reduced pressure to give a foam which was chromatographed on silica gel in benzene:ethyl acetate =3:1 to give the title compound (0.633 g; 63%), [α]$_D^{20}$ +161° (c 1.00, dioxan) m.p. 72 to 78.5°, $ν_{max}$. (CHBr₃) 3422, 3330 (NH), 1780 (β-lactam), and 1678 and 1510 cm$^{116}$ $^1$ (CONH), NMR(CDCl₃, τ) 2.67 (singlet; β-lactam NH), 3.44 (doublet, J 9 Hz; C—3 NH), 4.44 (double doublet, J 9,5 Hz; C—3H), 5.08 (doublet J 5 Hz; C—4H), 6.37 (singlet; Ph CH₂—), 7.44 (doublet J 7 Hz; —SCH₂—), 8.0-8.4 [multiplet; —CH(CH₃)₂] and 9.04 [doublet, J 7 Hz; (CH₃)₂].

EXAMPLE 5

Methyl 3-[3'R,4'R)-4'-(2''-methylpropyldithio)3'-phenylacetamidoazetidin-2'-on-1'-yl]-2-bromopropionate (3R,4R)-4-(2'-Methylpropyldithio)-3-phenylacetamidoazetidin-2-one (0.323 g. 0.001 mole) and sodium carbonate (0.5 g., 0.0047 mole) was stirred in acetone (4 ml.) containing water (1 ml.) at 20° while methyl 2,3-dibromopropionate (0.4 ml.) in acetone (2 ml.) was added over 1 hour. After a further 5 hours, the mixture was evaporated to remove the acetone and the residue extracted with ethyl acetate (2 × 50 ml.). The combined organic solutions were washed with water (2 × 30 ml.) and evaporated to give an oil. This was chromatographed on silica gel; elution with ethyl acetate:petrol (bp 60°–80°) = 1:1 gave methyl (3R,4R)-2[4'-(2''-methylpropyldithio)-3'-phenylacetamidoazetidin-2'-on -1'-yl]-3-bromopropionate (51 mg. 10%), $ν_{max}$. (CHBr₃) 3390 (NH), 1,760 (β-lactam) 1,734 (ester), and 1,678 and 1,518 cm⁻¹ (CONH), NMR (CDCl₃ τ) (mixture of diasteroisomers) 2.68 (singlet; phenyl protons), 3.56 (doublet, J 9 Hz; CONH), 4.44 and 4.48 (double doublets, J 9,4 Hz; C—3H), 4.91 and 5.04 (doublets, J 4 Hz; C—4H), 5.47 (multiplet;>NCH<) 6.20 (singlet; COOCH₃), 6.2 to 6.4 (multiplet; —CH₂Br), 6.39 (singlet; PhCH₂) 7.46 (doublet, J 7 Hz; —S—CH₂), 8.16 [multiplet; —CH(CH₃)₂], and 9.04 [doublet, J 7 Hz; (CH₃)₂].

EXAMPLE 6 p-Nitrobenzyl 3-[(3'R,4'R)-4'-(2''-methylpropyldithio)-3'-phenylacetamidoazetidin-2'-on-1'-yl]-2-bromopropionate A solution of (3R,4R)-2-methylpropyldithio)-3-phenylacetamidoazetidin-2-one (0.5 g. 1.54 m.mole) in acetone (15 ml.) containing anhydrous potassium carbonate (ca 3 g.) and p-nitrobenzyl 2-bromoacrylate (0.44 g 1 equiv.) was stirred at 22° for 16 hours. The reaction mixture was filtered over kieselguhr and the filtrate evaporated to a foam. This was chromatographed on silica (10 g.) with benzene:ethyl acetate = 4:1 as solvent to give the title compound (0.4 g., 42.5%), R$_f$ 0.48 (benzene:ethyl acetate = 1:1) 1R(CHBr₃) 3,426 (NH), 1,755 (β-lactam), 1,735 (CO₂R), 1,670 and 1,500 (CONH), 1,516 and 1,344 cm$^{116}$ $^1$ (—NO₂), NMR (CDCl₃ τ), 1.75 and 2.45 (AB-quartet, J 9 Hz,

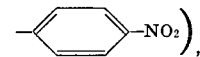, 2.65 (phenyl), 3.72 (NH), 4.5 and 5.0 (6-H and 5-H respectively, multiplet, J 4 Hz), 4.7

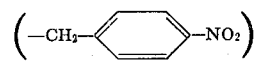

5.4 to 6.0 (multiplet —CH₂—CH—), 6.4 (—CH₂phenyl), 7.48 (doublet, S—CH₂), 8.2 (multiplet —CH) 9.0 and 9.06 ((CH₃)₂)

EXAMPLE 7

Bis-[(3R,4R)-3-phenylacetamidoazetidin-2-on-4-yl]disulphide (1st Method)

The starting material used in this Example was prepared as described in the copending Application Ser. No. 167,876 of Barton, Long, Looker, Wilson and Underwood.

A solution of (1R,5R)-3-benzyl-4-7-diaza-6-oxo-2-thia bicyclo [3,2,0]-hept-3-ene (5g., 0.023 mole) in dimethyl-suplhoxide (150 ml) and water (75 ml.) was treated with a solution of iodine (10 g) and potassium iodide (20 g) in water (50 ml.). The iodine solution (21.2 ml., 0.017 mole) was added dropwise over 1 hour when the iodine colour persisted and thin-layer chromatography indicated that reaction was complete.

The mixture was poured into water (500 ml.) and extracted with ethyl acetate (6 × 100 ml). The combined ethyl acetate extracts were washed with excess aqueous sodium thiosulphate, dried and evaporated under reduced pressure. As the evaporating solution reached a low volume, the product began to crystallise out and when it had become a slurry, the mixture was cooled in ice and filtered to give the title compound (3,9 g, 72%) as colourless prisms. A second crop (0.2 g. 3.7%) of crystalline material was obtained by evaporation of the mother liquors to dryness and crystallisation from ethyl acetate.

A sample of the product was recrystallised from tetrahydrofuran as colourless needles, m.p. 169° to 171°, [α]$_v^{21°}$ -12° (dimethyl sulphoxide, $ν_{max}$. 3,360 and 3,220 (NH), 1770 (β-lactam), 1,672 and 1,516 (CONH) cm$^{116}$ $^1$, NMR (d₆-DMSO, τ)

, 1.12 (doublet, J 9 Hz, CONH), 2.72 (C₆H₅), 4.86 (double doublet J 4.5 Hz, 9 Hz, 3-H) 5.14 (doublet, J 4.5 Hz), 6,48 (PhCH₂—) (Found: C,54.3; H, 4.7; N, 11.8; S, 13.1. C₂₂H₂₂N₄O₄S₂H₂O requires C, 54.1; H, 4.9; N, 11.5; S, 13.1%).

EXAMPLE 8

Bis-[(3R,4R)-3-phenylacetamidoazetidin-2-on-4-yl]disulphide (2nd method)

(1R,5R)-3-Benzyl-4,7-diaza-6-oxo-2-thia-bicyclo[3,2,0]-hept-3-ene (2.18 g 0.01 mole) was stirred in acetic acid (40 ml.) containing water (1 ml) at 21° while hydrogen peroxide (6 percent solution, 5.67 ml., 0.01 mole) was added over 1 hour. After a further 1.5 hours, sodium metabisulphite solution was added until starch-iodide paper indicated absence of oxidising agent remaining. The mixture was evaporated to a small volume and the residue was mixed with ethyl acetate (600 ml.). After washing with water, the ethyl acetate was evaporated until crystallisation began. A little ether was added and the white solid was collected by filtration. Further crystals were isolated from the mother liquors giving a combined yield of the title compound. (1.01 g, 44%), $[\alpha]_D^{20}$ −48° (c 1.00, dimethyl sulphoxide m.p. 167 to 170° I.R. and NMR spectra were in agreement with the standard (see Example 7).

EXAMPLE 9

Bis-[(3R,4R) -3-phenylacetamido-1-[(2′-bromo-2′-methoxycarbonyl)ethyl]azetidin-2-on-4-yl]disulphide A solution of methyl 2-[(1′R,5′R)-3′-benzyl-4′, 7′-diaze-6′-oxo-2′-thia-bicyclo[3′,2′,0]-hept-3′-ene-7′-yl]-3-bromo-propionate (0.5 g., 1.3 m.mole) in dimethylsulphoxide (15 ml.) containing water (10 ml.) at 22° was treated with a solution of iodine (2.5 g) and potassium iodide (5g) in water (15 ml.) until the uptake of iodine had ceased (0.4 ml.). The mixture was poured into water (150 ml.) and extracted with ethyl acetate. After washing with dilute sodium metabisuphite solution and water, drying, and evaporation, a foam was obtained. This was chromatographed on silica (6 g.) with benzene:ethyl acetate = 2:1 to give the title compound (0.2 g., 38.4%) as a foam ($R_f$ 0.13 ), $\nu_{max}$ (CHBr$_3$) 1,338 (NH), 1760 (β-lactam), 1,725 (CO$_2$R) and 1658 cm$^{-1}$ (-CONH), NMR (CDCl 3, τ) 2.62 and 2.64 (phenyl), 3.5 (multiplet, 3-H), 5.3 (multiplet, 3-H and N—CH—CO$_2$—), 6.40 (—CH$_2$-phenyl), and 6.20 (OCH$_3$).

EXAMPLE 10

(3R,4R)-4-n-Butyldithio-3-phenylacetamidoazetidin-2-one (1S,3S,5R,6R)-2,2-Dimethyl-3-hydroxy-6-phenylacetamidopenam, 1-oxide (9g., 0.28 mole) was suspended in n-butanethiol (85 ml. and heated at reflux for 16 hours. The excess reagent was removed under reduced pressure and the title compound was isolated by chromatography on silica gel with benzene: ethyl acetate = 2:1 as solvent. Crystallisation from ether and petrol (b.p. 60° to 80°) gave a colourless solid (4.1 g, 45%), m.p. 91° 94°, $[\alpha]_D^{21}$ + 110°(c 0.1 tetrahydrofuran), $\nu_{max}$ (CHBr$_3$) 3,400 (NH), 1,770 (β-lactam), 1,670 and 1,500 cm$^{-1}$ (CONH), NMR (CDCl$_3$, τ) 2.65 (phenyl), 3.15 (NH), 3.40 (NH), 4.45 and 5.1 (3-H and 4-H, multiplet, J 4 Hz), 6.40 (singlet; Ph CH$_2$—), 7.35 (triplet, SCH$_2$), 8.45 (multiplet, (CH$_2$)$_2$), and 9.1 (CH$_3$). (Found: C, 56.0; H, 6.3; N, 8.6; S, 19.3. C$_{15}$H$_{20}$N$_2$O$_2$S$_2$ requires: C, 55.6; H, 6.2; N, 8.7; S, 19.7%).

EXAMPLE 11

(3R,4R)-4-n-Butyldithio-3-phenoxyacetamidoazetidin-2-one (1S,3S,5R,6R)-2,2-Dimethyl-3-hydroxy-6-phenoxyacetamidopenam, 1-oxide (2g, 5.9 mmole) was suspended in n-butanethiol (25 ml) and heated at reflux for 16 hours. The excess reagent was removed under reduced pressure and trituration with ether gave the title compound (0.41g., 20.5%), m.p. 114° to 115° $[\alpha]_D^{21}$ + 90.5° (c 1,tetrahydrofuran), $\nu_{max}$ (CHBr$_3$) 3400 (NH), 1,780 (β-lactam), 1,690 and 1,521 (CONH) and 750 cm$^{-1}$ (Ph), NMR (CDCl$_3$, τ) 2.35 (NH), 2.60 to 3.15 (Ph), 4.32 (multiplet, J 4 Hz, 3-H), 4.91 (doublet, J 4 Hz, 4-H), 5.45 (OCH$_2$Ph), 7.29 (CH$_2$S), 8.45 (CH$_2$)$_2$), and 9.11 (CH$_3$). (Found: C, 53.1; H, 6.1; N, 8.2 S 18.8 C$_{15}$H$_{20}$N$_2$O$_3$S$_2$ requires C, 52.8; H, 5.9; N, 8.3; S, 18.8%)

The compound (1R,5R)-3-Benzyl-4,7-diaza-6-oxo-2-thiabicyclo[3,2,0]-hept-3-ene used as starting material in Preparations A and B and Examples 7 and 8 may be prepared as described in Example 1c of the copending Application Ser. No. 167,876 of Barton, Long, Looker Wilson and Underwood.

(1S,5R,6R)-2,2-Dimethyl-3-hydroxy-6β-phenylacetamidopenam, 1β-oxide, used as starting material in Examples 4 and 10, may be prepared as described in Example 2 of the copending Application Ser. No. 167,847 of Underwood and Hewitt.

(1S,3S,5R,6R)-2,2Dimethyl-3-hydroxy-6-phenoxyacetamidopenam, 1-oxide, used as starting material in Example 11, may be prepared as described in Example 12 of the copending Application Ser. No. 167,847 of Underwood and Hewitt.

We claim:

1. A compound of the formula

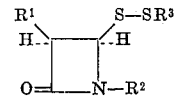

wherein R$^1$ is the group —NHCOR, where R is hydrogen or RCO—is selected from the group consisting of:

$$R^u(O)_rC_nH_{2n}—CO$$

where R$^u$ is cycloalkyl, cyclohexadienyl, phenyl, fluorophenyl, nitrophenyl, aminophenyl, acetoxphenyl, methoxphenyl, methylphenyl, hydroxyphenyl, N,N-bis(2-chloroethyl)-aminophenyl, R$^2$ is hydrogen, an alkyl or alkenyl group having up to 4 carbons and which can carry one or more halogen atoms, esterified carboxyl groups wherein the esterifying group is methyl, 2,2,2-trichlorethyl or p-nitro benzyl, or R$^2$ is a 1-pyrazolin-3-yl group; and R$^3$ is an alkyl group containing one to six carbon atoms, benzyl, phenethyl, phenylpropyl or a cycloalkyl group containing five to seven carbon atoms, r is 0 or 1 and n is an interger from 1–4.

2. p-Nitrobenzyl 3-[(3′R,4′R)-4′-(2″-methylpropyldithio)-3′-phenylacetamidoazetidin-2′-on-1′-yl]-2-bromopropionate.

* * * * *